(12) United States Patent
Kim (10) Patent No.: US 6,694,023 B1
(45) Date of Patent: Feb. 17, 2004

(54) METHOD AND APPARATUS FOR PROTECTING COPYRIGHT OF DIGITAL RECORDING MEDIUM AND COPYRIGHT PROTECTED DIGITAL RECORDING MEDIUM

(75) Inventor: Byung-Jun Kim, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/222,317

(22) Filed: Dec. 29, 1998

(30) Foreign Application Priority Data

Dec. 29, 1997 (KR) .............................. 97-77004

(51) Int. Cl.⁷ ..................... H04N 7/167; G06F 11/30
(52) U.S. Cl. ..................... 380/203; 713/193; 713/194
(58) Field of Search ..................... 713/194, 193, 713/151, 165, 167; 380/203, 201–202, 210

(56) References Cited

U.S. PATENT DOCUMENTS

| | | | | |
|---|---|---|---|---|
| 5,502,766 A | * | 3/1996 | Boebert et al. ............. 713/193 |
| 5,805,551 A | * | 9/1998 | Oshima et al. ............. 705/57 |
| 5,881,038 A | * | 3/1999 | Oshima et al. ............. 705/57 |
| 6,052,465 A | * | 4/2000 | Gotoh et al. ............. 705/58 |
| 6,266,299 B1 | * | 7/2001 | Oshima et al. ............. 369/13.38 |
| 6,285,763 B1 | * | 9/2001 | Gotoh et al. ............. 380/201 |
| 6,301,569 B1 | * | 10/2001 | Oshima et al. ............. 705/57 |

* cited by examiner

Primary Examiner—Gilberto Barrón
Assistant Examiner—Kambiz Zand
(74) Attorney, Agent, or Firm—Staas & Halsey LLP (57) ABSTRACT

A digital recording medium for protecting a copyright includes a data recording region on at least a part of which information encrypted using a cryptosystem is recorded, and a copy disapproval region on which a cypher key for decryption of the encrypted information recorded on the data recording region is recorded. When the digital recording medium is copied illegally, table identification information recorded thereon will be damaged. Thus, the information recorded on a recording medium obtained by illegally copying the digital recording medium cannot be reproduced normally. A playback apparatus for the digital recording medium includes a memory for storing the cryptosystem, a reader for reading data recorded on the digital recording medium, and a decrypter for decrypting the encrypted information recorded on the digital recording medium, based on the cypher key read from the digital recording medium by the reader.

37 Claims, 4 Drawing Sheets

METHOD AND APPARATUS FOR PROTECTING COPYRIGHT OF DIGITAL RECORDING MEDIUM AND COPYRIGHT PROTECTED DIGITAL RECORDING MEDIUM

CROSS-REFERENCE TO RELATED APPLICATIONS

This application claims the benefit of Korean Application No. 97-77004, filed Dec. 29, 1997, in the Korean Patent Office, the disclosure of which is incorporated herein by reference.

BACKGROUND OF THE INVENTION

1. Field of the Invention

The present invention relates to a copyright protection for a digital recording medium, and more particularly, to a copyright protection method and apparatus for a digital recording medium storing encrypted data and a copyright protected digital recording medium.

2. Description of the Related Art

In the future as well as at present, copyright protection for all contents or software used in audio/video (A/V) equipment or computer-related equipment is indispensable. Accordingly, hardware or software having various copyright protection functions is under development according to various standards or rules.

One of the currently developed or proposed copyright protection techniques utilizes the principle of a cryptosystem. There are a symmetrical cryptosystem represented by a data encryption standard (DES) and an asymmetrical cryptosystem represented by an RSA (Riverst, Shamir & Adleman), as a cryptosystem for encrypting information or a message itself. There are an authentication system and a content scramble system (CSS) as methods used to realize the above cryptosystems. There are a user authentication, a digital signature or a message authentication as the authentication system.

A macrovision, being a widely spread copyright protection technique, prevents a digital-to-analog copy. For example, when a copy or replica is attempted to be made into an analog magnetic tape as in a conventional video cassette recorder (VCR), the macrovision makes a sync signal continuously varied at random, to thus lower a picture quality abruptly. The content scramble system (CSS) being another copyright protection technique employs the authentication system and the cryptosystem at the same time, in order to prevent a digital-to-digital copy. The CSS is used for copyright protection of a digital versatile disk (DVD) ROM drive and a DVD decrypter card mounted on a computer. After the DVD-ROM drive and the DVD decrypter card have authenticated each other, encrypted A/V data which is recorded on a DVD-ROM is decoded through the decrypter card. That is, the DVD-ROM drive uses an incorporated chip or program to perform an authentication work with respect to the DVD decrypter card, and the DVD decrypter card uses an incorporated chip or program to perform an authentication work and a data decoding operation.

Meanwhile, a DVD player includes a separate chip or a micro-controller program which can decrypt encrypted data, and reads and reproduces the encrypted A/V data from a DVD without having an authentication procedure.

Using the above-described copyright protection techniques can only prevent unauthorized copies made by general users, but cannot prevent unauthorized copies made by technical copying experts.

SUMMARY OF THE INVENTION

To solve the above problems, it is an object of the present invention to provide a copyright protection method for a digital recording medium storing encrypted data.

It is another object of the present invention to provide a digital recording medium whose copyright is protected.

It is still another object of the present invention to provide an apparatus using a digital recording medium whose copyright is protected.

Additional objects and advantages of the invention will be set forth in part in the description which follows and, in part, will be obvious from the description, or may be learned by practice of the invention.

To accomplish the above and other objects of the present invention, there is provided a copyright protection method for protecting a copyright with respect to a digital recording medium, the copyright protection method including the steps of: (a) encrypting information to be recorded using a cryptosystem; (b) recording the information encrypted in step (a) on the digital recording medium; and (c) recording a cypher key necessary for decryption of the information encrypted in step (a) on the digital recording medium in a manner that the cypher key is not allowed to be copied.

There is also provided a digital recording medium including a data recording region on at least one part of which information encrypted using a cryptosystem is recorded; and a copy disapproval region on which a cypher key necessary for decryption of the encrypted information recorded on the data recording region is recorded.

There is further provided a playback apparatus for a digital recording medium including a data recording region on at least one part of which information encrypted using a cryptosystem is recorded; and a copy disapproval region on which a cypher key necessary for decryption of the encrypted information recorded on the data recording region is recorded, the playback apparatus including a memory for storing the cryptosystem; a reader for reading data recorded on the digital recording medium; and a decrypter for decrypting the encrypted information recorded on the digital recording medium, based on the cypher key read from the digital recording medium by the reader.

There is still further provided a digital recording and/or reproducing apparatus including a digital recording medium including a data recording region on at least one part of which information encrypted using a cryptosystem is recorded and a copy disapproval region on which a cypher key necessary for decryption of the encrypted information recorded on the data recording region is recorded; a memory for storing the cryptosystem; a reader for reading data recorded on the digital recording medium; and a decrypter for decrypting the encrypted information recorded on the digital recording medium, based on the cypher key read from the digital recording medium by the reader.

BRIEF DESCRIPTION OF THE DRAWINGS

The above objects and other advantages of the present invention will become more apparent by describing the preferred embodiment thereof in more detail with reference to the accompanying drawings, in which.

DESCRIPTION OF THE PREFERRED EMBODIMENTS

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

When encrypted data is recorded on a digital recording medium according to an embodiment of the present invention, a cypher key for decrypting the encrypted data is recorded on a copy disapproval region of the digital recording medium. Thus, a playback apparatus can reproduce encrypted data such as programs or information recorded on the digital recording medium only in the case that the cypher key recorded on the digital recording medium can be reproduced. In embodiments according to the present invention, after data has been encrypted using various cryptosystems including a symmetrical cryptosystem and an asymmetrical cryptosystem, the encrypted data is recorded on a data recording region of the digital recording medium and a cypher key used for encryption of data is recorded on a copy disapproval region positioned in the outer area of the data recording region. Here, the data recording region includes a lead-in area, a user or data area, and a lead-out area, and the copy disapproval region is positioned in the outer area of the data recording region. In particular, in the case that the digital recording medium is an optical disk, the copy disapproval region is positioned in the outer area of the lead-in area and in a position where an optical head can read data recorded on the copy disapproval region.

Figure 1:
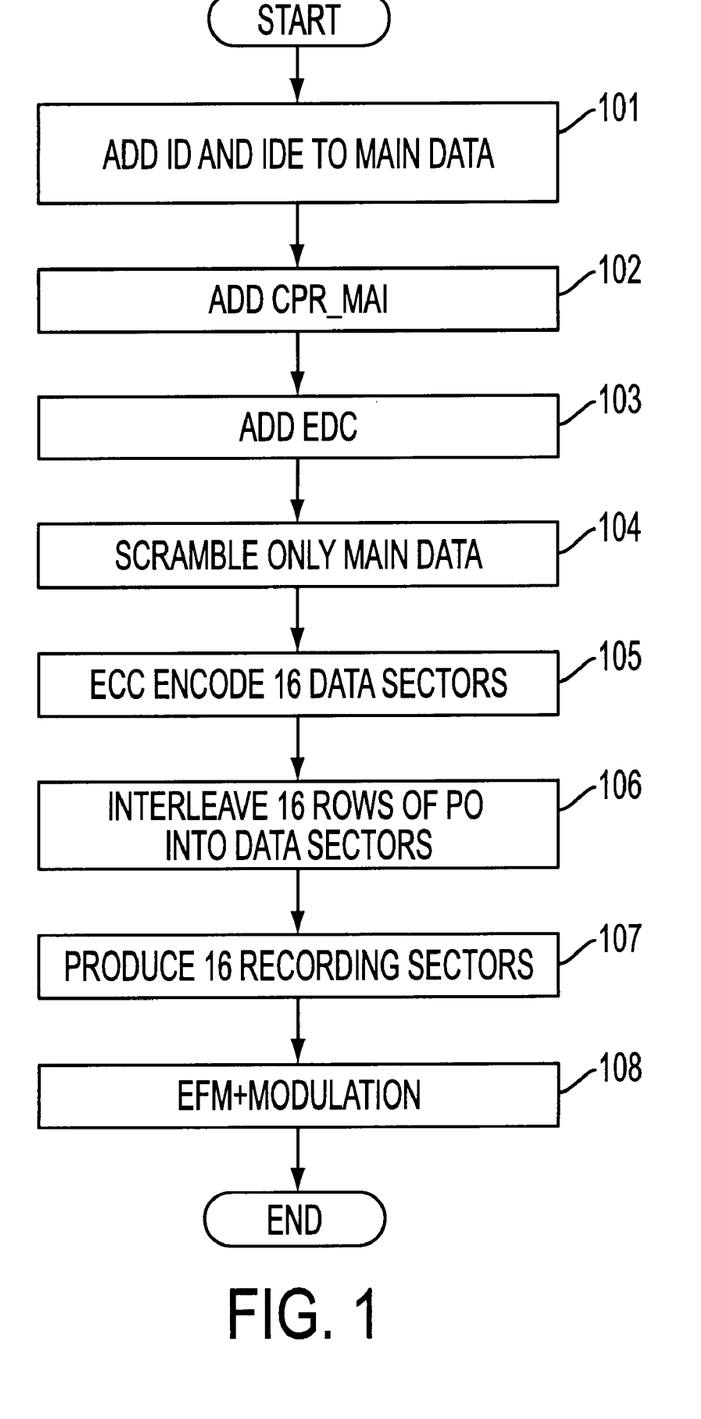
FIG. 1 is a flowchart diagram for explaining a signal processing when data is recorded on a DVD-ROM.

Prior to describing a first embodiment of the present invention, a general data recording method with respect to a DVD-ROM will be described below with reference to FIG. 1.

When software such as Audio/Video (A/V) data or programs is recorded on a DVD-ROM, the data or program is signal-processed in units of main data of 2048 bytes obtained by dividing the data or program. In step 101, identification (ID) data of 4 bytes and an ID error detection code (IDE) of 2 bytes for the ID are added in each unit of main data. Then, copyright management information CPR_MAI of 6 bytes is added therein in step 102. An error detection code (EDC) for all of the ID, IDE, CPR_MAI and the main data is added therein (step 103). After the EDC has been added, only the main data is scrambled (step 104). A data sector is produced performing steps 101 through 104.

An error correction (ECC) encoding for data sectors is performed with respect to 16 data sectors (step 105). A parity outer (PO) portion of 16 rows obtained by the ECC encoding is interleaved within the data sectors (step 106). As a result, 16 recording sectors are produced (step 107). Each recording sector is separated into 26 sync frames and data in each sync frame is eight-to-fourteen plus (EFM+) modulated using an EFM plus table (step 108). The EFM+ modulation is modified from EFM modulation data that is used for recording data on a compact disk (CD), in order to be appropriate for recording data on a read-only DVD (DVD-ROM). Actually, the EFM+ modulation is an eight-to-sixteen modulation for converting an 8-bit symbol into a 16-bit codeword expressed by a binary code. By performing step 108, 16 physical sectors are produced.

The EFM+ table used in step 108 complies with specifications for a DVD-ROM and includes a main conversion table and a substitution table. Each of the main conversion table and the substitution table has four states. Each state has 16-bit codewords individually corresponding to symbols and next state values individually corresponding to the codewords. For reference, the main conversion table has an association relationship between the codewords corresponding to 256 symbols. Since each state has the codeword and the corresponding next state value, a digital sum variation (DSV) is as close as possible to a direct-current (DC) level. As a DSV is closer to a DC level, a stable signal characteristic is provided even in the case of eccentricity of a DVD-ROM or damage on the disk surface.

In a first embodiment of the present invention, data to be recorded is modulated using an EFM+ table varied from the above-described EFM+ table, to thereby record the encrypted data on a recording medium. Also, in this embodiment, a table number representing a varied EFM+ table used for encrypting the data is used as a cypher key, and is recorded on a copy disapproval region of the recording medium, in order to protect a copyright with respect to the recording medium storing the data. For clarity, an EFM+ table according to the specifications for a DVD-ROM is defined as a "fundamental EFM+ table", and a EFM+ table modified from the fundamental EFM+ table is defined as a "varied EFM+ table".

In order to vary a fundamental EFM+ table according to the specifications for a DVD-ROM within a range where an error does not occur in a DVD recording and/or reproducing apparatus, the embodiment of the present invention lets symbols corresponding to decimal numbers 0 through 255 in the above-described main conversion table shift by one place. For example, when the main conversion table includes a codeword "0010 0000 0000 1001" corresponding to a symbol value "0", a codeword "0010 0000 0001 0010" corresponding to a symbol value "1", and a codeword "0010 0001 0010 0000" corresponding to a symbol value "2", one of the varied main conversion tables has a codeword "0010 0000 0001 0010" corresponding to a symbol value "0" and a codeword "0010 0001 0010 0000" corresponding to a symbol value "1". The above varying method of the fundamental EFM+ table, that is, a method for producing varied EFM+ tables by re-associating a symbol-codeword relationship in the fundamental EFM+ table is obvious to anyone who has an ordinary skill in the art. Therefore, a detailed realization method thereof will be omitted.

When a main conversion table is varied in the above manner, 255 varied EFM+ tables are obtained from the fundamental EFM+ table. In this embodiment, a symbol value in the main conversion table is used as a table number for each EFM+ table, in order to discriminate a total of 256 EFM+ tables, including a fundamental EFM+ table, from each other. Therefore, a varied EFM+ table having a codeword corresponding to a symbol value "1" in the unvaried main conversion table as a codeword corresponding to its own symbol value "0", has a table number "1". Also, the fundamental EFM+ table having the unvaried main conversion table has a table number "0". Such table numbers can be expressed by one byte, and can be changed as any figure or can be included in a serial number designated on a disk by a manufacturer. The table number is necessary for decoding the corresponding software and thus is recorded on a copy disapproval region in the DVD-ROM.

Figure 2:
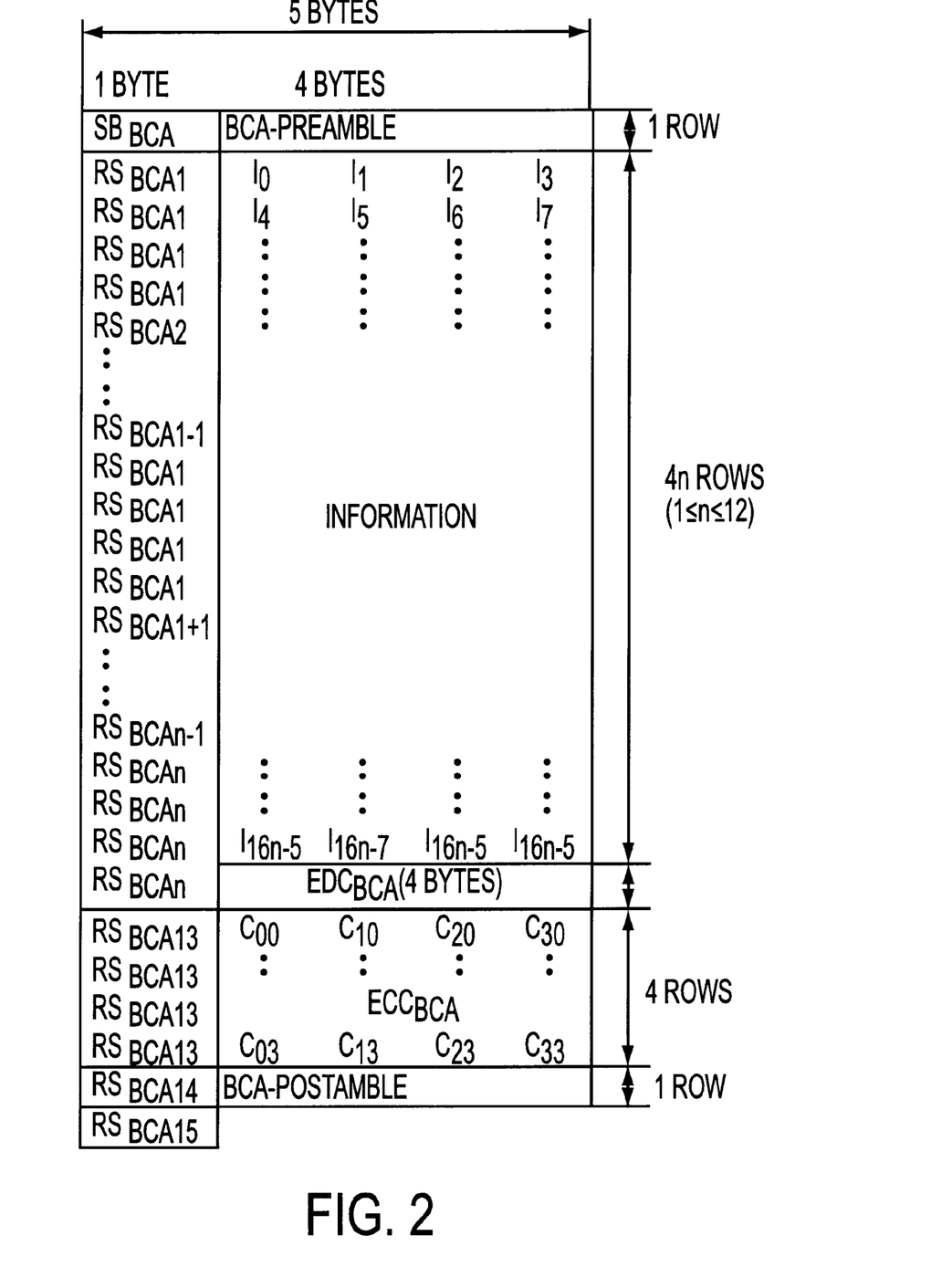
FIG. 2 shows the structure of a BCA code.

A copy disapproval region in a DVD-ROM where a table number corresponding to a varied EFM+ table used for modulating information to be recorded according to the embodiment of the present invention is recorded, will be described with reference to FIG. 2.

The DVD-ROM contains a burst cutting area (BCA) as a copy disapproval data recording region. A BCA code recorded on the BCA has a BCA preamble field of one row, a BCA data field of 4n (wherein $1 \leq n \leq 12$ and n is an integer), and a BCA postamble field of one row, in which each row has 5 bytes in size. These three BCA fields are sequentially recorded on a DVD without having a gap. The BCA preamble field has a BCA sync $SB_{BCA}$ of one byte and a BCA preamble of 4 bytes following the $SB_{BCA}$. The BCA data field has a BCA re-sync $RS_{BCA}$ being a leading portion of each row, a plurality of information data $I_0, I_1, \ldots, I_{16n-5}$ and an error correction code $ECC_{BCA}$. Each of the information data and the error correction code has 4 bytes in size.

In the first embodiment of the present invention, the BCA preamble of the above-described BCA, particularly, the last byte in the BCA preamble is used for recording a table number. Therefore, the BCA preamble becomes "00h 00h 00h XXh" with "XXh" representing a table number of the varied EFM+ table used for modulating the information to be recorded. In the case that a fundamental EFM+ table defined in the specifications for a DVD-ROM is used for modulation of data, a BCA preamble becomes "00h 00h 00h 00h". Therefore, the present invention can be compatible with a DVD playback apparatus which does not support a varied EFM+ table.

Figure 3:
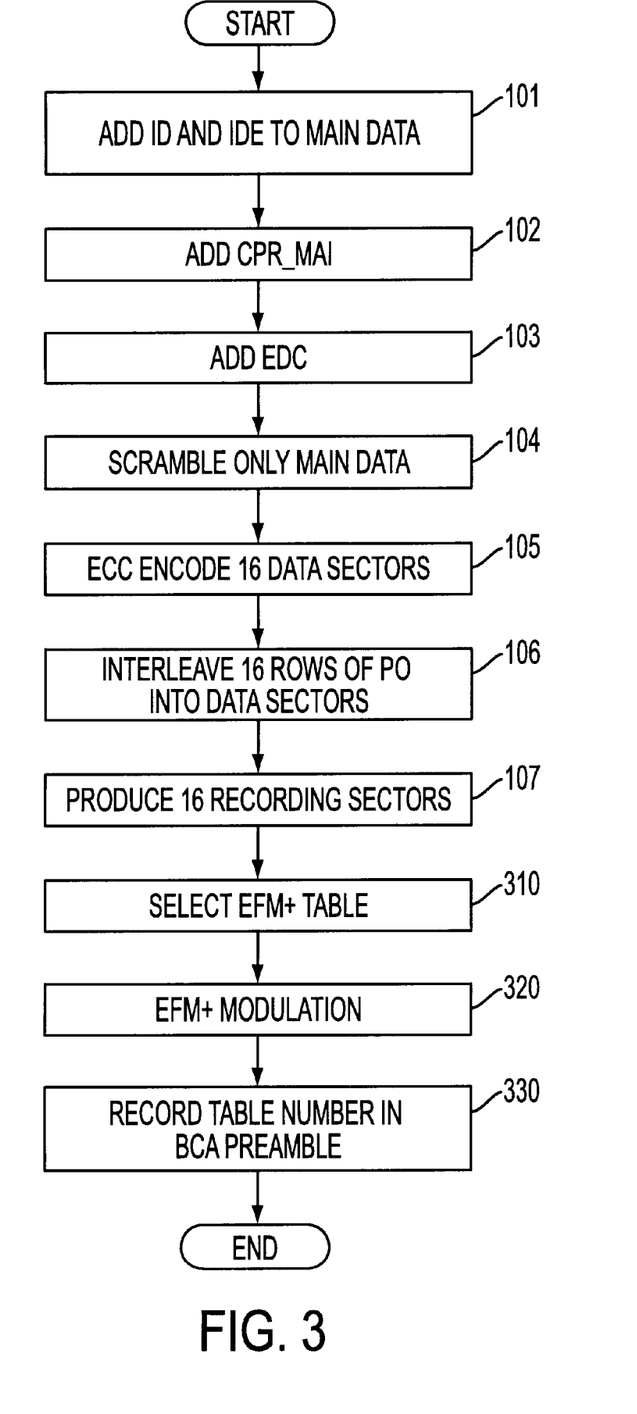
FIG. 3 is a flowchart diagram for explaining a signal processing when data is recorded on a DVD-ROM according to a first embodiment of the present invention.

FIG. 3 is a flowchart diagram for explaining a method of generating 16 physical sectors from data to be recorded, which is used in the first embodiment of the present invention.

In FIG. 3, steps 101 through 107 are the same as those described with reference to FIG. 1. Thus, the detailed description thereof will be omitted. In step 310, when encrypting data to be recorded, one of the 255 varied EFM+ tables except the fundamental EFM+ table is selected.

The 256 EFM+ tables are stored in a storage (not shown) in a DVD recording and/or reproducing apparatus and selectively retrieved from the storage for EFM-modulating data to be recorded and/or reproduced. The EFM+ tables are stored in the storage in the form of a variable EFM+ table which can generate the above-described 256 EFM+ tables by re-associating a symbol-codeword relationship. In this case, a varied EFM+ table which is obtained from the variable EFM+ tables and corresponds to information to be recorded and/or reproduced is stored in a separate RAM and the varied EFM+ table stored in the separate RAM is used for modulating and/or demodulating information to be recorded and/or reproduced. By doing so, data can be demodulated at a desired speed. Alternatively, 256 EFM+ tables stored in a ROM are used. In step 320, information to be recorded is modulated using the selected varied EFM+ table. As a result, 16 physical sectors are produced.

However, if all data including information to be recorded on a DVD-ROM is modulated using a varied EFM+ table and then recorded on a DVD, there is a problem concerning a compatibility during playback of the DVD. Thus, data to be recorded on a lead-in area of the DVD is modulated using a fundamental EFM+ table and information to be recorded on an information recording area of the DVD is modulated using a varied EFM+ table.

In step 330, separate data representative of the varied EFM+ table used for recording information on the DVD-ROM, that is, a cypher key such as the above-described table number is recorded on a separate region on the DVD-ROM, i.e. a BCA preamble. When reproducing data from the DVD-ROM, a DVD playback apparatus first reads a BCA code from the DVD-ROM to recognize a table number. Then, a demodulator in the DVD playback apparatus reads a varied EFM+ table corresponding to the recognized table number from an internal table RAM and demodulates information recorded on the DVD-ROM, for example, AN data or programs.

The above-described embodiment can be easily applied to A/V equipment or computer-related equipment which is essentially inexpensive, different from the equipment using existing copyright protection techniques requiring separate hardware or software and a common standard.

The above-described embodiment of the present invention uses a recording modulation of data using an EFM+ table as a cryptosystem. However, the present invention is not limited to the above embodiment. Therefore, the present invention can be applied to a digital recording medium storing encrypted data using various cryptosystems and various digital recording and/or reproducing systems for the digital recording media.

Figure 4:
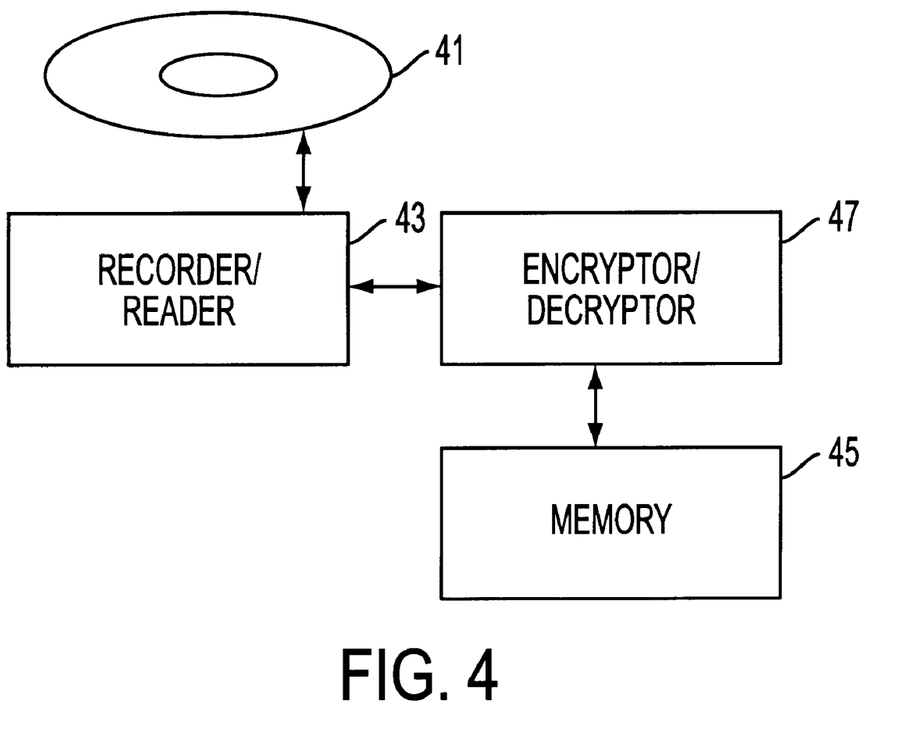
FIG. 4 is a block diagram showing a digital recording/reproducing apparatus according to a second embodiment of the present invention.

FIG. 4 shows a digital recording and/or reproducing apparatus according to a second embodiment of the present invention. The digital recording and/or reproducing apparatus shown in FIG. 4 uses an existing recording modulation method for a data recording modulation without any modification, and uses a separate cryptosystem for encrypting information to be recorded and/or decrypting the encrypted information to be reproduced.

The digital recording and/or reproducing apparatus of FIG. 4 performs recording and/or reproduction of the encrypted information with respect to an optical disk 41. The apparatus includes a recorder/reader 43 for the optical disk 41, a memory 45 for storing a cryptosystem and an encryptor/decryptor 47 for encrypting or decrypting information using the cryptosystem stored in the memory 45.

The optical disk 41 includes a data recording region for recording the encrypted information and a BCA used as a copy disapproval region. Recorded on the BCA is a cypher key for decrypting the encrypted information recorded on the data recording region. A portion on which the cypher key is recorded is a BCA preamble. However, since the recording position does not limit the present invention, the cypher key can be recorded on a portion where an undefined portion exists in the BCA data field. The BCA is formed on a portion of a transparent window located between a central hole and a lead-in area on the optical disk. In particular, the BCA is formed on a position where an optical head provided in the recorder/reader 43 can read data recorded on the BCA. A DVD-ROM, a DVD-RAM or a hybrid DVD can be used as the optical disk 41 used in the FIG. 4 apparatus. The hybrid DVD has a read-only ROM area and a rewritable RAM area as the data recording region.

When the recording and/or reproducing apparatus shown in FIG. 4 reproduces encrypted information from the optical disk 41, the recorder/reader 43 reads a cypher key recorded on the BCA of the optical disk 41 loaded into a deck (not shown) and reads the encrypted information recorded on the data recording region. The encrypted information and the cypher key are supplied to the encryptor/decrypter 47. The encryptor/decrypter 47 decrypts the encrypted information using the read cypher key and the cryptosystem stored in the memory 45. The decrypted information is supplied to a signal processor (not shown).

The encrypted information recorded on the data recording region of the optical disk 41 can be encrypted using existing various encryption systems or techniques. Therefore, in the case that the memory 45 stores cryptosystems according to a plurality of encryption techniques, the recording and/or reproducing apparatus shown in FIG. 4 can decrypt the data stored on the optical disk 41 and encrypted using the various cryptosystems, by means of a corresponding cryptosystem stored in the memory 45 and a single cypher key recorded on the BCA. Also, when the memory 45 is implemented as a RAM, the cryptosystem recorded in the memory 45 can be altered into another cryptosystem.

Meanwhile, the optical disk 41 is a DVD-RAM or a hybrid DVD which is legally sold or provided, the recording and/or reproducing apparatus shown in FIG. 4 encrypts new information using the cypher key which already has been recorded on the BCA and records the encrypted new information on the optical disk 41, or records the encrypted information which can be decoded using the cypher key recorded on the BCA, on the optical disk 41. Therefore, in this case, a software provider can provide encrypted information to be added in the contents contained in the optical disk 41 only to a legal end user, without any separate confirmation on whether the optical disk 41 is possessed legally.

In the above second embodiment, a recording and reproducing apparatus for a digital recording medium in particular has been described. However, it is also obvious to anyone skilled in the art that a reproduction-only apparatus for a digital recording medium can be embodied from the second embodiment within the scope of the present invention.

As described above, the copyright protection method and apparatus and the copyright protected digital recording medium can protect a copyright with respect to contents which are sold or provided through digital recording media. In addition, since a copyright protection function can be realized using a currently available modulation table, a playback apparatus for a copyright protected digital recording medium can be manufactured at low cost.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A copyright protection method to protect a copyright with respect to information to be recorded on a digital recording medium, the copyright protection method comprising:
   encrypting the information to be recorded on the digital recording medium using a cryptosystem of a plurality of cryptosystems;
   recording the information encrypted on the digital recording medium; and
   recording a cypher key to differentiate the cryptosystem, among the plurality of cryptosystems, as the cryptosystem used to encrypt the encrypted information, such that the encrypted information can be decrypted by using the cryptosystem, not stored on the digital recording medium, after identification by the cypher key, with the cypher key being recorded so that the cypher key is not allowed to be copied,
   wherein said digital recording medium is an optical disk and said cypher key is recorded on a burst cutting area (BCA) of the optical disk.

2. A copyright protection method to protect a copyright with respect to information to be recorded on a digital recording medium, the copyright protection method comprising:
   encrypting the information to be recorded on the digital recording medium using a cryptosystem;
   recording the information encrypted on the digital recording medium; and
   recording a cypher key to decrypt the information encrypted on the digital recording medium so that the cypher key is not allowed to be copied,
   wherein said digital recording medium is an optical disk and said cypher key is recorded only in a BCA preamble of a burst cutting area (BCA) of the optical disk.

3. The copyright protection method according to claim 1, wherein said optical disk is a digital versatile disk (DVD) and said cryptosystem is a content scramble system.

4. The copyright protection method according to claim 1, wherein said optical disk is a DVD-ROM.

5. The copyright protection method according to claim 1, wherein said optical disk is a DVD-RAM.

6. The copyright protection method according to claim 1, wherein said optical disk is a hybrid DVD comprising a RAM area and a ROM area as information storage areas.

7. A copyright protection method to protect a copyright with respect to information to be recorded on a digital recording medium, the copyright protection method comprising:
   encrypting the information to be recorded on the digital recording medium using a stored cryptosystem, of a plurality of cryptosystems, with the cryptosystem not being recorded on the recording medium;
   recording the information encrypted on the digital recording medium;
   recording a cypher key to decrypt the information encrypted on the digital recording medium so that the cypher key is not allowed to be copied, with the cypher key differentiating the cryptosystem, among the plurality of cryptosystems, as the cryptosystem used to encrypt the encrypted information;
   reading the cypher key from the digital recording medium; and
   decrypting the encrypted information recorded on the digital recording medium using the cypher key read and the cryptosystem.

8. A copyright protection method to protect a copyright with respect to information to be recorded on a digital recording medium, the copyright protection method comprising:
   encrypting the information to be recorded on the digital recording medium using a cryptosystem;
   recording the information encrypted on the digital recording medium; and
   recording a cypher key to decrypt the information encrypted on the digital recording medium so that the cypher key is not allowed to be copied,
   wherein said cryptosystem is a modulation method to modulate the information to be recorded using a varied table whose relationship between symbols and codes are varied from a predetermined table, and table identification information representative of the varied table is used as the cypher key.

9. The copyright protection method according to claim 8, wherein said predetermined table is an eight-to-fourteen modulation plus (EFM+) table, the varied table is a varied EFM+ table and the digital recording medium is a DVD.

10. The copyright protection method according to claim 9, wherein said table identification information is a data symbol value in the predetermined EFM+ table corresponding to a data symbol value "0" in the varied EFM+ table.

11. A digital recording medium, comprising:
   a data recording region, wherein at least a part of information is encrypted using a cryptosystem and recorded in a user/data area of the data recording region; and
   a copy disapproval region on which a cypher key to decrypt the encrypted information recorded on the data recording region is recorded,
   wherein said digital recording medium is an optical disk and which comprises a preamble, of a burst cutting area (BCA), with the cypher key being recorded only in the preamble.

12. The digital recording medium according to claim 11, wherein said optical disk is a digital versatile disk (DVD) and said cryptosystem is a content scramble system.

13. The digital recording medium according to claim 11, wherein said optical disk is a DVD-ROM.

14. The digital recording medium according to claim 11, wherein said optical disk is a DVD-RAM.

15. The digital recording medium according to claim 11, wherein said optical disk is a hybrid DVD comprising a RAM area and a ROM area as information storage areas.

16. A digital recording medium, comprising:
   a data recording region, wherein at least a part of information is encrypted using a cryptosystem and recorded in a user/data area of the data recording region; and
   a copy disapproval region on which a cypher key to decrypt the encrypted information recorded on the data recording region is recorded,
   wherein said cryptosystem is a modulation method to modulate the information to be recorded using a varied table whose relationship between symbols and codes are varied from a predetermined table, and the cypher key is table identification information representative of the varied table.

17. The digital recording medium according to claim 16, wherein said predetermined table is an eight-to-fourteen modulation plus (EFM+) table, the varied table is a varied EFM+ table and the digital recording medium is a DVD.

18. The digital recording medium according to claim 17, wherein said table identification information is a data symbol value in the predetermined EFM+ table corresponding to a data symbol value "0" in the varied EFM+ table.

19. A playback apparatus for a digital recording medium including a data recording region, wherein at least a part of information is encrypted using a cryptosystem, of a plurality of cryptosystems, and recorded in a user/data area of the data recording region, and a copy disapproval region on which a cypher key to decrypt the encrypted information recorded on the data recording region is recorded, the playback apparatus comprising:
   a memory to store the plurality of cryptosystems prior to a reading of the digital recording medium;
   a reader to read the encrypted information and cypher key recorded on the digital recording medium; and
   a decrypter to decrypt the encrypted information, recorded on the digital recording medium and read by the reader, using the cryptosystem, with the cypher key differentiating the cryptosystem, among the plurality of cryptosystems, as the cryptosystem used to encrypt the encrypted information.

20. A digital recording and/or reproducing system, comprising:
   a digital recording medium including a data recording region, wherein at least a part of information is encrypted using a cryptosystem, of a plurality of cryptosystems, and recorded in a user/data area of the data recording region, and a copy disapproval region on which a cypher key necessary to decrypt the encrypted information is recorded, with the cypher key differentiating the cryptosystem, among the plurality of cryptosystems, as the cryptosystem that was used to encrypt the encrypted information;
   a memory to store the plurality of cryptosystems prior to a reading of the digital recording medium;
   a reader to read the encrypted information recorded on the digital recording medium; and
   a decrypter to decrypt the encrypted information recorded on the digital recording medium and read by the reader, based on the cypher key read by the reader.

21. A digital recording and/or reproducing system, comprising:
   a digital recording medium including a data recording region, wherein at least a part of information is encrypted using a cryptosystem, of a plurality of cryptosystems, and recorded in a user/data area of the data recording region, and a copy disapproval region on which a cypher key necessary to decrypt the encrypted information is recorded;
   a memory to store the plurality of cryptosystems;
   a reader to read the encrypted information recorded on the digital recording medium; and
   a decrypter to decrypt the encrypted information recorded on the digital recording medium and read by the reader, using the cryptosystem stored in the memory based on a differentiation of the cryptosystem, among the plurality of cryptosystems, by the cypher key as being the cryptosystem used to encrypt the encrypted information,
   wherein said digital recording medium is an optical disk which comprises a burst cutting area (BCA) on which said cypher key is recorded.

22. A digital recording and/or reproducing system, comprising:
   a digital recording medium including a data recording region, wherein at least a part of information is encrypted using a cryptosystem and recorded in a user/data area of the data recording region, and a copy disapproval region on which a cypher key necessary to decrypt the encrypted information is recorded;
   a memory to store the cryptosystems;
   a reader to read the encrypted information recorded on the digital recording medium; and
   a decrypter to decrypt the encrypted information recorded on the digital recording medium and read by the reader, based on the cypher key read by the reader,
   wherein said digital recording medium is an optical disk which comprises a burst cutting area (BCA), with a BCA preamble on which said cypher key is recorded.

23. The digital recording and/or reproducing apparatus according to claim 21, wherein said optical disk is a digital versatile disk (DVD) and said cryptosystem is a content scramble system.

24. The digital recording and/or reproducing apparatus according to claim 21, wherein said optical disk is a DVD-ROM.

25. The digital recording and/or reproducing apparatus according to claim 21, wherein said optical disk is a DVD-RAM.

26. The digital recording and/or reproducing apparatus according to claim 21, wherein said optical disk is a hybrid DVD comprising a RAM area and a ROM area as information storage areas.

27. The copyright protection method according to claim 1, wherein the BCA has a BCA data field on which the information is to be recorded, and the cypher key is recorded on an undefined portion of the BCA data field.

28. The digital recording medium according to claim 16, wherein the BCA has a BCA data field on which the information is to be recorded, and the cypher key is recorded on an undefined portion of the BCA data field.

29. The digital recording medium according to claim 17, wherein the data recording region comprises:

a data area on which the information encrypted using the cryptosystem is modulated using the varied EFM+ table and recorded; and a lead-in area on which other information is modulated using the EFM+ table and recorded.

30. The copyright protection method according to claim 2, wherein said optical disk is a digital versatile disk (DVD) and said cryptosystem is a content scramble system.

31. The copyright protection method according to claim 2, wherein said optical disk is a DVD-ROM.

32. The copyright protection method according to claim 2, wherein said optical disk is a DVD-RAM.

33. The copyright protection method according to claim 2, wherein said optical disk is a hybrid DVD comprising a RAM area and a ROM area as information storage areas.

34. The digital recording and/or reproducing apparatus according to claim 22, wherein said optical disk is a digital versatile disk (DVD) and said cryptosystem is a content scramble system.

35. The digital recording and/or reproducing apparatus according to claim 22, wherein said optical disk is a DVD-ROM.

36. The digital recording and/or reproducing apparatus according to claim 22, wherein said optical disk is a DVD-RAM.

37. The digital recording and/or reproducing apparatus according to claim 22, wherein said optical disk is a hybrid DVD comprising a RAM area and a ROM area as information storage areas.

* * * * *